United States Patent [19]

Jaffe

[11] Patent Number: 4,460,839

[45] Date of Patent: Jul. 17, 1984

[54] MAGNETIC LAMINAE SECTIONS FOR SINGLE AIR GAP MOTOR

[75] Inventor: Wolfgang Jaffe, Roselle Park, N.J.

[73] Assignee: The Singer Company, Stamford, Conn.

[21] Appl. No.: 157,597

[22] Filed: Jun. 9, 1980

[51] Int. Cl.³ .............................................. H02K 21/26
[52] U.S. Cl. ....................................................... 310/154
[58] Field of Search ................. 310/152, 154, 156, 254

[56] References Cited

U.S. PATENT DOCUMENTS

| | | | |
|---|---|---|---|
| 3,590,293 | 6/1971 | Susdorf | 310/159 |
| 3,836,801 | 9/1974 | Yamashita et al. | 310/154 |
| 3,891,876 | 6/1975 | Herr et al. | 310/154 X |
| 4,023,057 | 5/1977 | Meckling | 310/154 |
| 4,151,435 | 4/1979 | Jamdeska et al. | 310/154 |

Primary Examiner—Donovan F. Duggan
Attorney, Agent, or Firm—Robert E. Smith; Edward L. Bell

[57] ABSTRACT

A dynamoelectric machine having a stator of permanent magnet segments, each segment being formed of a plurality of laminae concentrically oriented with respect to the armature, wherein an outer laminae exhibits demagnetization characteristics effective to prevent substantial permanent loss of magnetism in an inner laminae.

5 Claims, 4 Drawing Figures

MAGNETIC LAMINAE SECTIONS FOR SINGLE AIR GAP MOTOR

DESCRIPTION

BACKGROUND OF THE INVENTION

This invention relates to dynamoelectric machines and, more particularly to permanent magnet single air gap electric motors and generators.

A typical single air gap motor arrangement is disclosed in U.S. Pat. No. 3,891,876, issued June 24, 1975, Herr et al, the rights of which are owned by the assignee of the present invention and the teachings of which are incorporated herein by reference. Herr discloses an electric motor having a single nonmagnetic armature with commutated windings and mounted for rotation centrally in a single air gap formed between opposed pairs of permanent magnets having oppositely polarized poles. The magnetic flux density provided by ceramic magnets of conventional configuration is generally not great enough for use in a single air gap permanent magnet motor, however, sufficient air gap flux is provided through the use of rare earth alloy magnets.

Performance of this single air gap motor was superior to that of conventional permanent magnet motors, however, use of the rare earth magnets substantially increased its cost. This cost problem was overcome through the development of annular segment permanent magnets as disclosed in U.S. patent application Ser. No. 070,770, filed Aug. 30, 1979, Herr et al, the teachings of which are incorporated herein by reference. These magnets are magnetized radially with respect to the axis of the armature and are constructed with a ratio of thickness to inner diameter that greatly concentrates the magnetic flux density within the air gap. This permits the use of relatively inexpensive high energy ceramic magnetic materials. This structure results in an operating load line, relative to the inner diameter of the magnet, well within the linear range of demagnetization characteristics for a given range of operating temperatures and levels of demagnetizing fields. The operating load line relative to the much larger outer diameter, on the other hand, is outside this linear range for the more powerful ceramic magnets resulting in irreversible loss of magnetic flux when these magnets are subjected to temperatures below approximately 20° C. or to the presence of relatively low energy demagnetizing fields. These concepts will be discussed more fully below.

SUMMARY OF THE INVENTION

It is an object of this invention to provide a permanent magnet configuration utilizing high energy ceramic magnetic materials, in whole or in part, to provide adequate flux density for use in a single air gap permanent magnet motor.

It is another object of this invention to provide a permanent magnet configuration utilizing high energy ceramic magnetic materials whereby there is little or no irreversible loss of magnetic flux due to changes in ambient temperature within a predetermined range or due to the presence of demagnetizing fields having a field strength less than a predetermined value.

Other objects and advantages of the invention will become apparent through reference to the accompanying drawings and descriptive matter which illustrate a preferred embodiment of this invention.

According to the present invention there is provided a dynamoelectric machine having a solid nonmagnetic cylindrical armature with commutated windings and means rotationally mounting the armature within a single air gap. The single air gap is formed by a plurality of peripheral spaced permanent magnets having oppositely polarized poles which are magnetized radially with respect to the axis of rotation. Each magnet is formed of a plurality of laminae, the interfacing surfaces of which are formed substantially normal to a radius of the axis of rotation which intersects the magnet.

BRIEF DESCRIPTION OF THE DRAWINGS

In order that the invention be more fully understood, it will now be described by way of example with reference to the accompanying drawings in which.

DETAILED DESCRIPTION OF THE INVENTION

Figure 1:
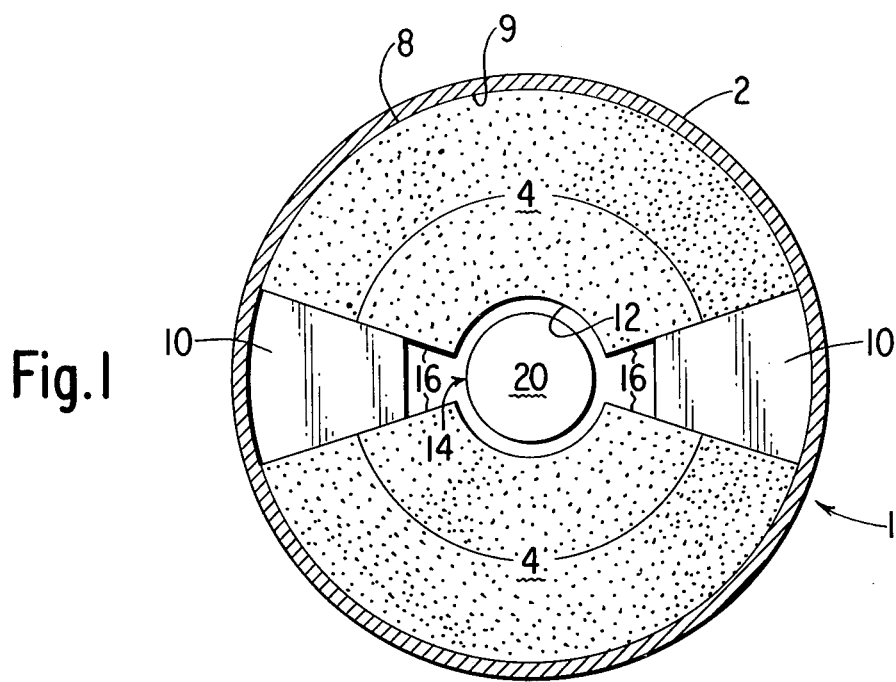
FIG. 1 is a cross-sectional view of a typical single air gap electric motor.

Referring to FIG. 1 there is shown an electric motor 1, in cross section, having a ferrite casing 2, two annular field magnet segments 4 each of which has an outer arcuate surface 8 in close contact with the inner diameter 9, of the casing 2, and two nonmagnetic spacer blocks 10 for relative positioning of the two segments 4 within the casing 2. Each of the magnet segments 4 has an inner arcuate pole face 12 forming an arc of a circle concentric to the casing 2, thus forming a single air gap 14. The two sides 16 of each magnet segment 4 are radially oriented with respect to the center of the air gap 14. Positioned within and coaxial to the air gap 14 is a rotatable cylindrical armature 20 constructed of nonmagnetic materials. This armature is more completely described in U.S. Pat. No. 3,891,876 referred to above. Although not shown in the drawings, the ends of the housing 12 are adapted to be enclosed by suitable end caps, not shown, having bearing members in which the shaft, not shown, is journalled for rotation. Additionally, the end cap surrounding the commutator, not shown, contains a conventional contact brush assembly having provision for electrical connection thereto to control the rotation of the motor 1 from an external electric power source, in a manner well known in the art.

Figure 2:
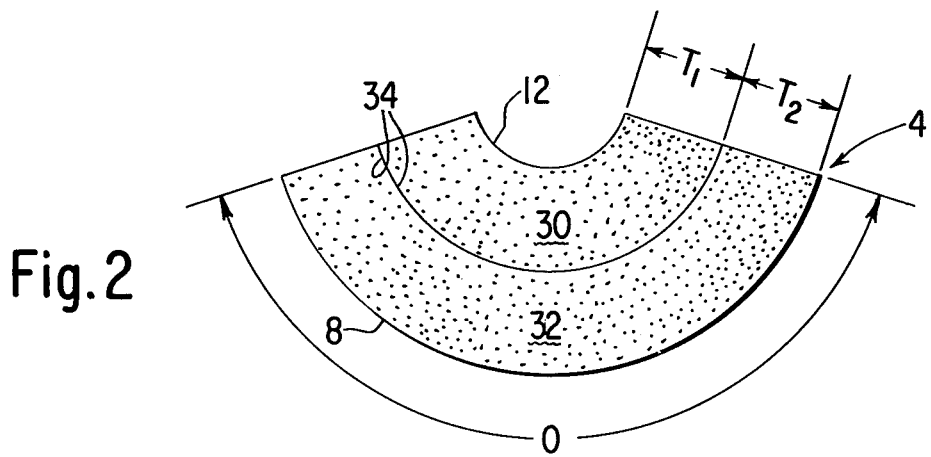
FIG. 2 is a plan view of an annular magnet segment constructed in accordance with the teachings of this invention.

The field magnet segments 4, as shown in FIG. 2, are composed of two laminae 30 and 32 having common arcuate abutting surfaces 34 which are substantially concentric to the arcuate surfaces 8 and 12 and substantially normal to a radius of the axis of rotation of the armature, wherein the radius intersects the segment 4. The thickness $T_1$ of the laminae 30 and the thickness $T_2$ of the laminae 32 are substantially uniform throughout their arcuate length, however, this is not essential to the successful practice of this invention. It should be noted that by altering the ratio of $T_1$ to $T_2$ with respect to angular displacement, the shape of the flux field generated within the single air gap 14 may be adjusted and thereby effect maximum performance of the motor. The magnet segments 4, each subtend an arc O, as shown in FIG. 2, which, in the preferred embodiment, approximately equals 145°. This angle may vary depending on the application of the motor. Further, the use of magnet segments composed of laminae as described herein should not be limited to two pole motors. The principles of this invention may be applied to any operable motor having a rotating armature and a permanent magnet stator.

In the preferred embodiment the laminae 30 is made of a high energy ceramic material having a high residual induction such as the M8 magnet manufactured by Allen-Bradley of Milwaukee, Wisconsin. The thickness $T_1$ is chosen so that the operating load point with respect to the surface 34, when the magnet is stabilized at a predetermined minimum ambient temperature, say $-20°$ C., falls within the range of linear demagnetization so that no irreversible loss of magnetism occurs when the magnet is subsequently subjected to a higher ambient temperature, say $+20°$ C. The range of linear demagnetization as referred to herein is represented by the straight line portion of the demagnetization curves shown in FIG. 4, e.g. the portion of the curve 134 between point 136 and point 138 just above the knee of the curve. These demagnetization curves define the relationship between the coercive force and the flux density for a given magnetic material at a given temperature. The outer laminae 32 is composed of a material having demagnetization characteristics such that for a selected thickness $t_2$ the operating load point with respect to the surface 8 at the minimum temperature, also falls within the range of linear demagnetization. The magnetic properties of this material, similar to the Allen-Bradley M7 magnet, exhibit a somewhat lower residual induction than the M8, but a higher coercive force. The resulting affect of the two laminae having differing magnetic properties is a relatively high density of magnetic flux within the air gap 14 and substantially no irreversible loss of magnetism within the range of operating temperatures. Similarly, where the electric motor is utilized in an environment having a demagnetizing field of a predetermined maximum strength, the thicknesses $T_1$ and $T_2$ are selected so that the operating load points with respect to the surfaces 12, 34, and 8 fall within the range of linear demagnetization so that irreversible loss of magnetism is prevented.

Figure 3:
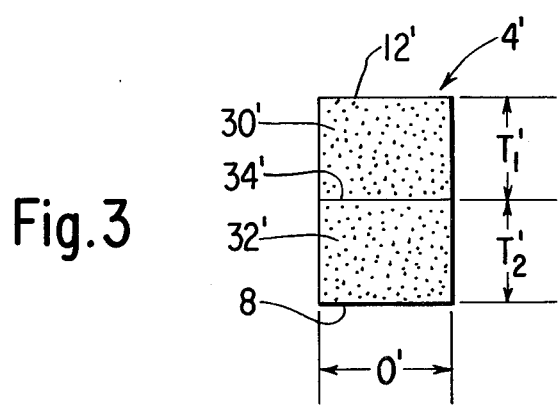
FIG. 3 is a plan view of a rectangular magnet segment constructed in accordance with the teachings of this invention.

The principles of this invention apply equally well to annular shaped permanent magnets as shown in FIG. 2 or to rectangular shaped permanent magnets as shown in FIG. 3, wherein symbols used to denote similar surfaces retain the same value as in FIG. 2 but are primed. Thus, the thicknesses $T_1'$ and $T_2'$ of FIG. 3 correspond to $T_1$ and $T_2$ of FIG. 2, and the width O' corresponds to the angle O. The laminae 30 and 32 may also be formed as layers wherein their interface would not necessarily be well defined surfaces such as surfaces 34. In this case the magnet segment 4 would appear as a single piece of magnetic material having two layers, or zones, each having differing magetic properties but no visually identifiable mutual boundary. This and similar structures are deemed within the spirit and scope of the present invention.

Figure 4:
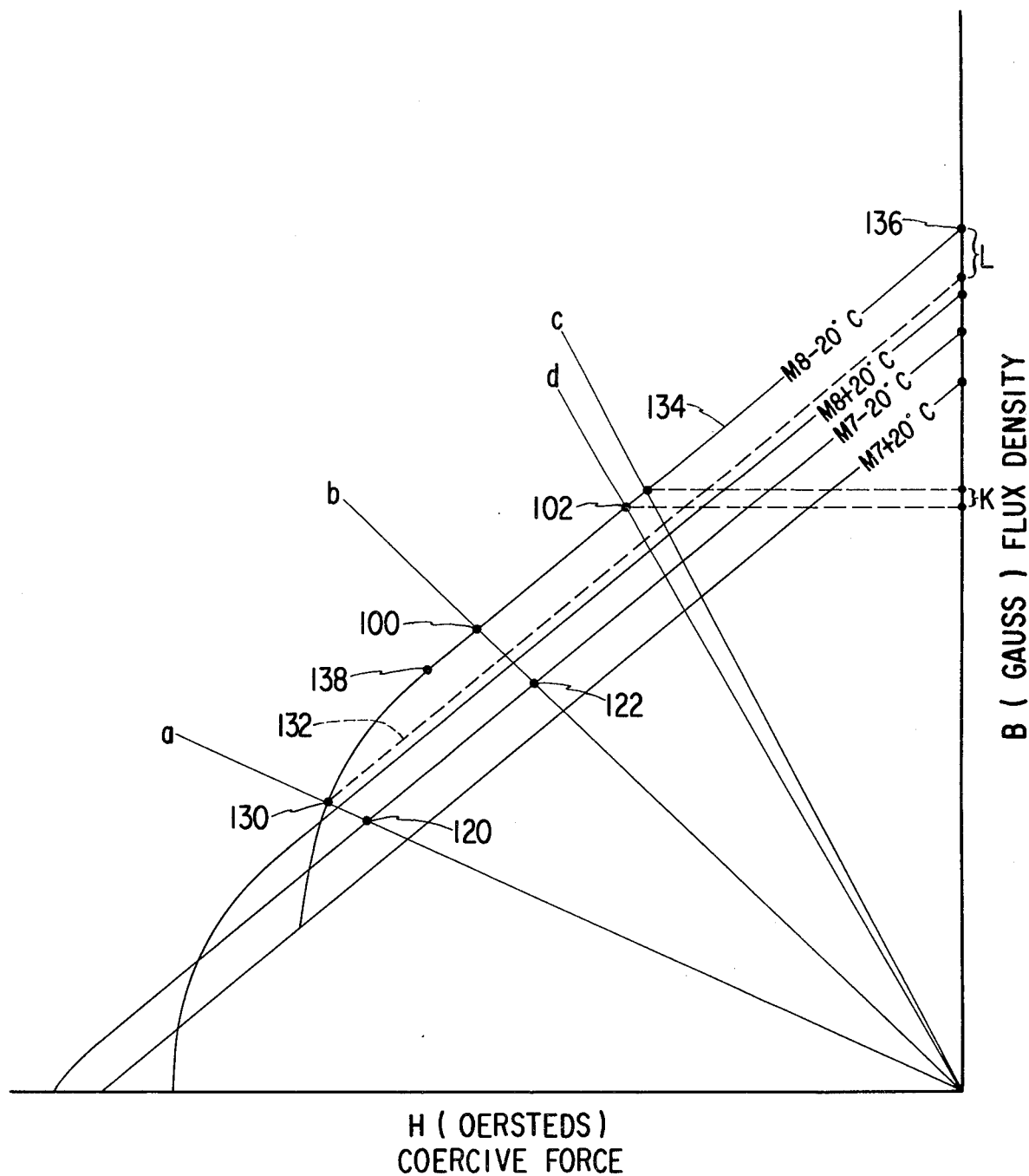
FIG. 4 illustrates demagnetization curves at various temperatures for typical high energy ceramic magnetic materials.

Referring to FIG. 4 there are four demagnetization curves shown. Two curves represent the demagnetization characteristics for M7 material at $+20°$ C. and $-20°$ C. while the other two curves represent the demagnetization characteristics for M8 material at these temperatures.

Lines a, b, and c represent the operating load lines for the magnet segment 4 at the surfaces 8, 34, and 12 respectively when the segment 4 is composed entirely of M8 material. In this case there will be a permanent loss of magnetism when the segment 4 is lowered to a temperature of 20° C. because the operating load line a intersects the demagnetization curve for M8 material at point 130, well into the non-linear portion of the curve. In this case a new demagnetization curve is established along the dashed line 132 for M8 material at $-20°$ C. resulting in a net loss L of flux. This concept is discussed more fully in U.S. patent application Ser. No. 15,847, filed Feb. 27, 1979, the teachings of which are incorporated herein by reference.

Where the segment 4 is constructed of two laminae 30 and 32 composed of M8 and M7 materials respectively, line d represents the operating load line at the surface 12. Thus, it is seen that only minor loss K of flux results from the use of these two materials. However, since the two operating load lines b and d of the laminae 30 intersect the demagnetization curve for M8 material at points 100 and 102, well within the linear portion of the $-20°$ C. curve, there is no irreversible loss of magnetism for the laminae 30. Similarly, the two operating load lines a and b of the laminae 32 intersect the $-20°$ C. demagnetization curve for M7 material at points 120 and 122 resulting in no irreversible loss of magnetism for the laminae 32.

The important and unique features of this invention are achieved through the utilization of magnets comprising two or more laminae, at least two of which are composed of materials having differing magnetic properties. Their respective thicknesses are selected so that the flux density at the single air gap is maximized while at the same time the demagnetization characteristics are such that the magnets experience no irreversible loss of flux when subjected to a predetermined temperature or to a predetermined strength or level of demagnetizing field.

I claim:

1. In a dynamoelectric machine having a nonmagnetic cylindrical armature with commutated windings thereon, and means rotatably mounting said armature about the cylindrical axis thereof and coaxially within a single air gap formed by a plurality of peripheral spaced permanent magnets, said magnets formed substantially of equal size and annular shape are equally spaced about and concentric to said axis wherein each of said magnets subtends an arc of predetermined angular displacement and comprises a plurality of laminae having interfacing surfaces which are formed substantially normal to a radius of said axis which intersects said magnet, wherein said plurality of laminae comprises two laminae having respective thicknesses $t_1$ and $t_2$ wherein the ratio of $t_1$ to $t_2$ is arranged so that when said magnets are exposed to a second predetermined ambient temperature subsequent to being stabilized at a first predetermined ambient temperature there is no substantial permanent loss of magnetism of said magnets.

2. In a dynamoelectric machine having a nonmagnetic cylindrical armature with commutated windings thereon, and means rotationally mounting said armature about the cylindrical axis thereof and coaxially within a single air gap formed by a plurality of peripheral spaced permanent magnets, said magnets formed substantially of equal size and annular shape are equally spaced about the concentric to said axis wherein each of said magnets subtends an arc of predetermined angular displacement and comprises a plurality of laminae having interfacing surfaces which are formed substantially normal to a radius of said axis which intersects said magnet, wherein said plurality of laminae comprises two laminae having respective thicknesses $t_1$ and $t_2$ wherein the ratio of $t_1$ to $t_2$ is arranged so that when said magnets are exposed to a demagnetizing field having a second predetermined level of flux subsequent to being stabilized in a demagnetizing field having a first predetermined level of flux there is substantial permanent loss of magnetism of said magnets.

3. In a dynamoelectric machine having a nonmagnetic cylindrical armature with commutated windings thereon, and means rotationally mounting said armature about the cylindrical axis thereof and coaxially within a single air gap formed by a plurality of peripheral spaced permanent magnets having oppositely polarized poles facing the axis of said armature and magnetized radially to said axis, wherein:

a. each of said magnets are formed substantially of equal size and annular shape, are equally spaced about and concentric to said axis, and comprise a plurality of laminae radially arranged and having annular shaped interfacing surfaces in direct mutual contact;

b. said interfacing surfaces are formed substantially normal to a radius of said axis which intersects said surface;

c. each of said magnets subtends an arc length of approximately 145°; and d. the outer one laminae of said plurality of laminae exhibiting demagnetization characteristics effective to prevent substantial permanent loss of magnetism in said inner one laminae due to temperature changes and due to the presence of demagnetizing fields.

4. In a dynamoelectric machine as set forth in claim 3 wherein the ends of said permanent magnets are substantially radially oriented with respect to said axis.

5. In a dynamoelectric machine as set forth in claim 4 wherein one laminae of said plurality of laminae is composed of high energy ceramic magnetic material.

* * * * *

UNITED STATES PATENT OFFICE
CERTIFICATE OF CORRECTION

Patent No. 4,460,839   Dated July 17, 1984

Inventor(s) Wolfgang Jaffe and John A. Herr

It is certified that error appears in the above-identified patent and that said Letters Patent are hereby corrected as shown below:

Title page:

Please add John Herr, Garwood, New Jersey, as co-inventor.

Signed and Sealed this

Nineteenth Day of February 1985

[SEAL]

Attest:

DONALD J. QUIGG

*Attesting Officer*   *Acting Commissioner of Patents and Trademarks*